United States Patent [19]
Kimball

[11] Patent Number: 4,498,343
[45] Date of Patent: Feb. 12, 1985

[54] METHOD AND APPARATUS FOR TWO-AXIS SCREENING VIBRATION

[76] Inventor: David V. Kimball, 132 W. Chestnut, Monrovia, Calif. 91016

[21] Appl. No.: 375,891
[22] PCT Filed: Mar. 23, 1982
[86] PCT No.: PCT/US80/00350
     § 371 Date: May 4, 1982
     § 102(e) Date: May 4, 1982
[51] Int. Cl.³ .......................... B06B 1/04; B06B 3/00
[52] U.S. Cl. .......................................... 73/663; 73/668
[58] Field of Search ................. 73/662, 663, 664, 665, 73/668

[56] References Cited
U.S. PATENT DOCUMENTS

| | | | |
|---|---|---|---|
| 3,056,910 | 10/1962 | Hajian | 73/664 |
| 3,194,992 | 7/1965 | Brown | 73/668 |
| 3,242,724 | 3/1966 | Ceparano et al. | 73/665 |
| 3,830,099 | 8/1974 | Ichikawa | 73/668 |
| 3,913,389 | 10/1975 | Larson | 73/665 |
| 4,265,123 | 5/1981 | Cappel | 73/663 |

FOREIGN PATENT DOCUMENTS 0104866  8/1979  Japan ........................ 73/662

Primary Examiner—Stephen A. Kreitman
Attorney, Agent, or Firm—Wagner & Bachand

[57] ABSTRACT

Two axis shaker vibration of a slip plate is achieved by use of angularly disposed shakers of novel design, each being provided with an armature cantilevered from the slip plate and free to laterally translate at the same time they drive the slip plate. Pivoting moments are converted to linear motion by a torsionally stiff flexure support for the slip plate.

47 Claims, 5 Drawing Figures

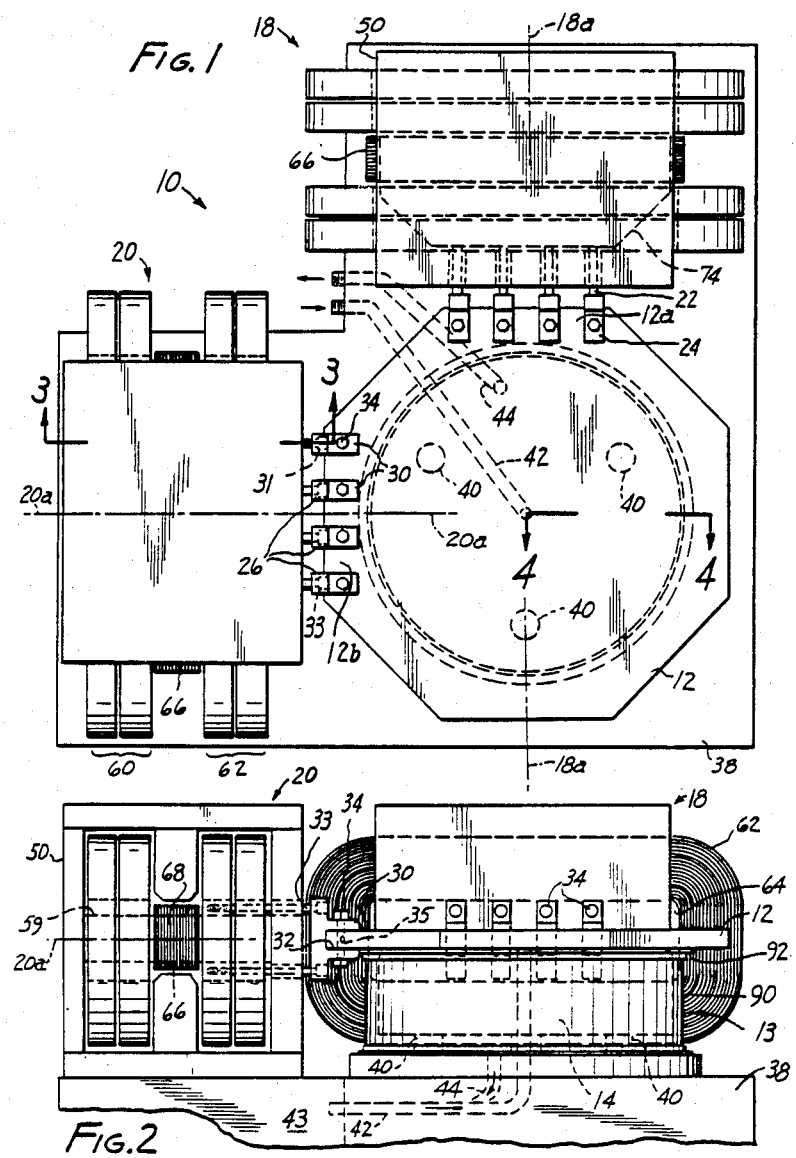

METHOD AND APPARATUS FOR TWO-AXIS SCREENING VIBRATION

TECHNICAL FIELD

This invention has to do with screening vibration evaluation of products for manufacturing defects as an integral step in the manufacturing process, and more particularly is concerned with method and apparatus for screening components, and assembled products, in electronic, mechanical, and electromechanical technologies for manufacturing defects by a simultaneous two-axis vibration on a slip plate. The invention is further concerned with realizing two-axis screening vibration free of pivoting motion around the central vertical axis of the slip plate, for high precision vibration screening of manufactured products through the use of random or sine signal inputs to a pair of vibration shakers separately driving, and mutually reciprocally slaved to each other, through a common slip plate carrying the test piece.

BACKGROUND ART

It is known to impart vibrational energy to a test piece to evaluate the vibration resistance of the piece, design defects and manufacturing defects. Many electronic, mechanical, and electromechanical products, particularly those intended for aerospace applications are thus screened before use. Routine quality control inspection of products having electronic, mechanical, and electromechanical components by vibration evaluation is less common, although such testing will reveal component problems and misassemblies, and other manufacturing defects in products having good design but poor manufacturing execution. Such quality control inspection as an integral part of the manufacturing process is referred to herein as product "screening" in that defective products are screened from other production.

In general, vibration shakers used for design evaluation and destructive testing are too complex, too large and cumbersome to operate for production use by manufacturing companies. What has been available in shakers has been largely aimed at test laboratories and has had features and capabilities, and prices, commensurate with the needs and capacities of that market.

There exists a need for a low cost, relatively compact screening vibration apparatus which has the features important to screening vibration use, e.g. easy operation, high reliability, precision control and a vibration capability likely to reveal manufacturing defects in electronic, mechanical and electromechanical products. Ideally, such apparatus will vibrate the test piece in two axes simultanously, for thorough inspection in minimum time.

Simultaneous two axis vibration of a common slip plate on which the test piece is carried requires vibration energy input in two different axes, e.g. at right angles to each other, with the first vibration input not limiting the second input, despite being coupled to a common slip plate. Also, the tendency of the inputs to deteriorate into movement around rather than across the slip plate center vertical axis, i.e. pivotal or rotational movement about that axis of the slip plate must be blocked if true two-axis linear vibrational movement is to be realized. These seemingly inherently contradictory requirements have been previously unresolved, with attempts involving mechanical coupling of the slip plate to the shaker through spherical or swivel couplings at either end of coupling links, but in the present invention method and apparatus are provided which affords true two-axis vibration, prevents pivoting motion, and does so in a simple, straightforward manner so that the apparatus is readily constructed, easily operated, low in capital cost, and precisely reliable in screening testing applications. Unlike, the swivel coupling devices, the present apparatus avoids the addition of mass inherent in using links, avoids the use of high pressure hydraulic systems to keep the swivel couplings lubricated, and avoids driving through an angle which is characteristic of rigid link systems.

DESCRIPTION OF THE INVENTION

It is therefore a primary object of the invention to provide simultaneous two-axis screening vibration capability to industry. It is another object to provide method for vibrating a common slip plate in two axes simultaneously for screening evaluation of a test piece thereon. Still another object is the provision of apparatus to carry out the foregoing method including a new shaker apparatus typically rectangular, and made up of low cost readily fabricated parts and in which the armature is cantilevered relative to the field coils by the slip plate being driven by the armature. Another object is to provide apparatus using first and second vibration shakers driving a slip plate in a first and second axis respectively, and slaved to each other through the slip plate so that the longitudinal driving of the first shaker is accommodated by a degree of lateral freedom in the second while the second drives at the same time and vice-versa. It is another and highly important object of the invention to provide means for constraining the doubly driven slip plate to movement in the axes of driving, by blocking pivoting movement of the slip plate and converting pivoting moments to linear motion along one or another of, or between, the primary axial motions. A further object is provision of longitudinally bendable, torsionally stiff support to the slip plate for achieving the two-axis constraining of the slip plate. Still another object is the cantilever suspension of the shaker armatures from the slip plate to realize lateral translation freedom.

These and other objects of the invention to become apparent hereinafter are realized in accordance therewith in vibration screening apparatus for the screening testing for manufacturing defects of a test piece carried on a rigid slip plate, the apparatus comprising vibrating means driving the slip plate in two coplanar axes simultaneously, and separate means from the vibrating means constraining said slip plate movement into the driving axes.

In particular embodiments of the invention, the vibrating means comprises first and second vibration shakers separately coupled to the slip plate in angularly disposed relation for driving the slip plate in the driving axes; there is further included a rigid slip plate, the constraining means comprising torsion means fixed to the slip plate in a manner limiting slip plate freedom of movement to the driving axes, a slip plate support block supporting the slip plate in universally slidable relation, a mass supporting the slip plate support block, the torsion means being fixed to the mass and to the slip plate against pivoting movement of the slip plate relative to the mass, and the torsion means comprising a longitudinally bendable, torsionally stiff torsion member adapted to be fixed to the slip plate and to the mass spaced from the slip plate, the torsion member being so constructed and arranged as to permit linear movement of the slip plate in it driving axes while blocking slip plate pivoting movement about its central vertical axis and relative to the mass.

In such embodiments, the vibration screening apparatus the vibrating means typically comprises first and second vibration shakers relatively angularly disposed about a horizontally extended locus of slip plate two-axis vibration, the torsion member being vertically disposed and fixed to the underside of the slip plate within the locus, a rigid slip plate is horizontally disposed within the vibration locus, the torsion means being cylindrical, and including also means circularly affixing the cylindrical torsion means to the slip plate underside; there is further provided a slip plate support block relatively less horizontally extended than the slip plate and having an oil film supply to its surface of supporting engagement with the slip plate, whereby the slip plate is supported in universally slidable relation within the vibration locus, the torsion means cylinder enclosing the support block. Thus, in a typical embodiment, the vibration shakers are typically at right angles to each other, there is a mass supporting the slip plate support block, and means circularly affixing the torsion means cylinder to the mass at the lower cylinder end, the torsion means cylinder being affixed at its upper end to the slip plate, whereby alternate shaker driving of the slip plate in either of the two axes is accommodated by longitudinal bending of the torsion means cylinder between the mass and the slip plate, while pivoting slip plate moments resultant from driving of the slip plate in two axes simultaneously by the shakers are converted to linear movement along a slip plate driving axis by the torsional stiffness of the torsion means cylinder.

In another embodiment, the invention provides a vibration shaker comprising field coil means and an armature having longitudinal displaceability and lateral freedom bodily within the field coil means for two axis vibration of a slip plate coupled to the armature.

In this embodiment, typically the armature comprises a wire winding of generally rectangular cross-section disposed normal to the armature axis of longitudinal displacement, and there is further included an armature frame supporting the wire winding in its disposition, the armature frame defining an open, generally rectangular figure, and the wire winding extends longitudinally in concentric rectangles on the inner and outer surfaces of the frame.

Also, in such embodiment, the field coil means comprises a wire coil defining a generally rectangular opening congruent with and larger than the armature frame, and there is included also means for connecting the armature frame to a slip plate driver bar in cantilevered relation, the means comprising an adaptor secured between the frame and the driver bar, the field coil means including a coil of wire surrounding the adpator between the armature frame and the slip plate driver bar. Typically the connecting means further comprises a skirt extension on the armature frame beyond the wire winding, and armature frame securing means to the adaptor including skirt extension receiving means formed on the adaptor, e.g. the frame skirt extension is rectangular and terminates in a thin edge, and the adaptor defines a complementary rectangular slot adapted to receive the frame skirt edge. Further, the adaptor defines a series of rectangularly distributed driver bar bolt holes adapted to receive driver bar supporting bolts, and the invention further contemplates provision of a driver bar bolted to the adaptor, the driver bar being bolted to the slip plate.

In a particularly preferred embodiment, the field coil means comprises front and rear generally rectangular wire coils disposed transversely to and relatively spaced along the armature displacement longitudinal axis in operative association with the armature, each front and rear coil means typically comprising a pair of like wire coils.

In a most particularly preferred embodiment, the inventon provides a vibration shaker apparatus for two axis vibration of a slip plate carrying a test piece, the apparatus comprising: a first vibration shaker comprising first field coil means and a first armature having longitudinal displaceability in a first axis and lateral freedom in a second axis bodily within the field coil means: and a second vibration shaker comprising second field coil means and a second armature having longitudinal displaceability in the second axis and lateral freedom bodily within the second field coil means in the first axis, the armatures being driven separately by their respective field coils for driving the slip plate coupled thereto in two axes simultaneously in slip plate supported relation.

In this embodiment, particular features are that in each armature comprises a wire winding of generally rectangular cross-section disposed normal to the axis of armature longitudinal displacement, and further comprises an open, generally rectangular metal frame, and each wire winding extends longitudinally in concentric rectangles on the inner and outer surfaces of the frame; each field coil means comprises a wire coil defining a generally rectangular opening lying in the plane transverse to the armature axis of longitudinal displacement; for each shaker there is provided means for connecting the armature frame to the slip plate in cantilever fashion, the connecting means including a slip plate driver bar, an adaptor of generally rectangular cross-section secured between the frame and the driver bar, the field coil wire coil rectangular opening surrounding the adaptor between the armature frame and the slip plate driver bar, a rectangular skirt extension on the armature frame terminating in a thin edge beyond the wire winding, and armature frame securing means on the adaptor including skirt extension receiving means comprising a complementary rectangular recess formed in a face of the adaptor to receive the frame skirt edge; the adaptor opposite the skirt extension recess defines a series of rectangularly distributed driver bar bolt holes adapted to receive driver bar supporting bolts; the first and second shakers are disposed at right angles to each other, and there is also included a common slip plate, and first and second driver bars bolted to first and second adaptors coupled separately to right-angle disposed sides of the slip plate, the slip plate supporting the first and second armatures for two-axis vibration; there are front and rear generally rectangular wire coils defining the field coil means and disposed transversely to and relatively spaced along the armature displacement longitudinal axis in operative association with the armature, and a housing enclosing the shaker apparatus, the housing passing the driver bar bolts free of interference in the laterally translated condition of the armature.

It is further preferred in the foregoing embodiments to further include means such as torsion means for constraining slip plate movement into the driving axes; the shakers separately coupled to the slip plate in angularly disposed relation for driving the slip plate in the driving axes; a rigid slip plate, the torsion means being fixed to the slip plate in a manner limiting slip plate freedom of movement to the driving axes; a slip plate support block supporting the slip plate in universally slidable relation; a mass supporting the slip plate support block, the torsion means being fixed to the mass and to the slip plate against pivoting movement of the slip plate around its center vertical axis and relative to the mass; the torsion means comprising a longitudinally bendable, torsionally stiff torsion member adapted to be fixed to the slip plate and to a mass spaced from the slip plate, the torsion member being so constructed and arranged as to permit linear movement of the slip plate in its driving axes while blocking slip plate pivoting movement around its center vertical axis and relative to the mass; the shakers being disposed at right angles to a horizontally extended locus of slip plate two axis vibration, and the torsion member being vertically disposed and fixed to the underside of the slip plate within the locus; the rigid slip plate being horizontally disposed within the vibration locus, the torsion means being cylindrical, and means circularly affixing the cylindrical torsion means to the slip plate underside comprising an annular ring fixed to the slip plate within said torsion means, and an external clamp slip-tightly clamping said torsion means to said ring; the slip plate support block being relatively less horizontally extended than the slip plate and having an oil film supply to its surface of supporting engagement with the slip plate, whereby the slip plate is supported in universally slidable relation within the vibration locus, the torsion means cylinder enclosing the support block in oil-confining relation; and including also means circularly affixing the torsion means cylinder to the mass at the lower cylinder end, the torsion means cylinder being affixed at its upper end to the slip plate, whereby shaker driving of the slip plate in either of the armature longitudinal axes is accommodated by longitudinal bending of the torsion means cylinder between the mass and the slip plate, while pivoting slip plate moments resultant from driving of the slip plate in two axes simultaneously by the shakers are converted to linear movement along the slip plate driving axes by the torsional stiffness of the torsion means cylinder, and the slip plate is returned to center position by the memory of the torsion means cylinder.

The invention thus provides in a further particular embodiment a vibration shaker apparatus for two axis vibration of a slip plate carrying a test piece, the apparatus comprising: a slip plate; a first vibration shaker comprising a housing and therewithin a horizontally disposed center pole plate, first spaced double pairs of rectangular field coils, and between the double coil pairs a first metal frame supported wire armature cantilevered from the slip plate and having longitudinal displaceability in a first axis and lateral freedom in a second axis bodily between the field coil double pairs, said coil pairs and said armature lying in a series of spaced parallel vertical planes and enclosing said center pole plate in their respective vertical planes; and a second vibration shaker identical to the first in center pole plate, field coils and armature arrangement and disposed at a right angle to the first shaker so that its armature also cantilevered from the slip plate has longitudinal displaceability in the second axis and lateral freedom bodily between field coil double pairs in the first axis, and a torsion member guiding the slip plate from below preferentially linearly along or between the axes by torsionally resisting pivoting movement of the slip plate in response to being driven separately by the armatures in two axes simultaneously.

There is further contemplated in the preceding and other embodiments of the invention, provision of means inputting random and/or sine vibration signals to each shaker in armature longitudinal displacement controlling relation, including microprocessors, controllers, amplifiers and the like known in the art for providing vibration signals electronically.

As noted above, the invention provides in addition to the apparatus, the method for effecting screening testing of a test piece carried on a rigid slip plate, which includes vibrating the slip plate in two coplanar axes simultaneously while separately constraining the slip plate for movement in driving axes only, and cantilever supporting the shaker armatures on the slip plate for lateral translational freedom. In such methods, there is included driving the slip plate from a first side thereof along one of the axes, driving the slip plate from a second side thereof along the other of the axes, the first and second axes being angularly disposed, and blocking pivoting response of the slip plate to the driving forces to limit slip plate movement to the two major axes, and as well, maintaining the slip plate fixed to a mass through a longitudinally bendable torsion member during slip plate driving in slip plate movements along the axes permitting and slip plate driving force induced pivoting movement resisting relation.

THE DRAWING

The invention will be further described as to an illustrative embodiment thereof in conjunction with the attached drawings in which, FIG. 1 is plan view of the screening vibration apparatus according to the invention;

FIG. 2 is a side elevation view thereof;

PREFERRED MODES

Figure 3:
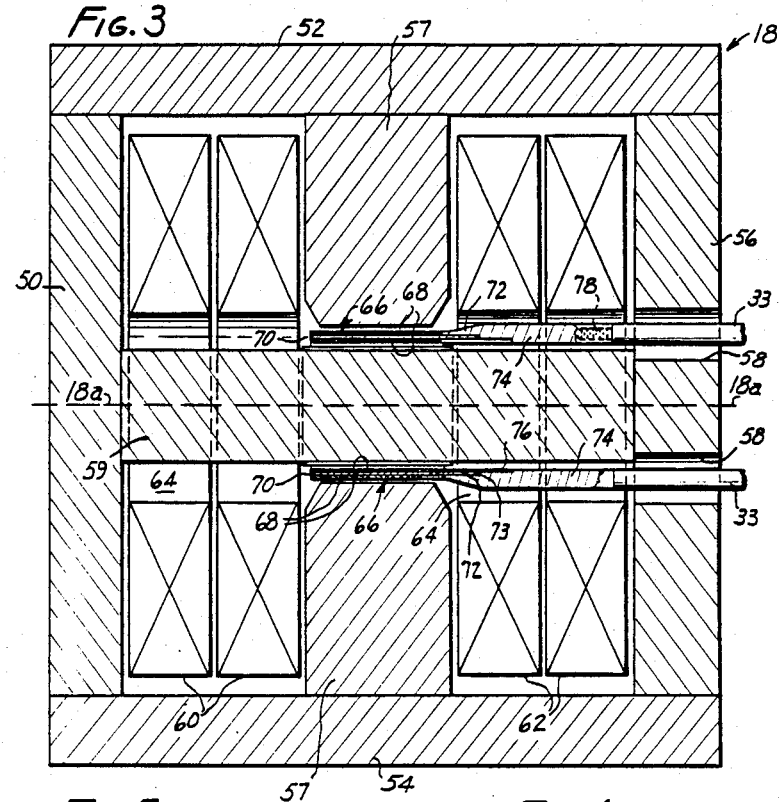
FIG. 3 is an enlarged, vertical section view of the shaker field coil and armature taken on line 3—3 in FIG. 1.

In the present invention the slip plate moves along straight lines, i.e. linearly and across its starting locus or null point, sometimes on the first driving axis, sometimes on the second driving axis, sometimes along another axis or line resultant from simultaneous driving in both primary axes which line is on neither primary axis. The actual slip gate movement is the product of the signals input into the apparatus, which are typically random or sinusoidal, and which add or substract from one another irregularly giving the desired pattern of test movement. Reference to "driving axes" herein refers to the original longitudinal or primary axes of the two shakers which are the starting point for slip plate movement, and as well to the other, secondary axes of movement resultant from interaction of the longitudinal driving forces at the slip plate. The flexure used to constrain slip plate movement to driving axes blocks pivoting movement, by torsional rsistance thereto, while permitting all manner of linear movement on both the primary and the secondary driving axes.

With reference now to FIGS. 1 to 5 of the drawings in detail, the vibration screening apparatus according to the invention is shown at 10. Slip plate 12 is supported on a polished, cylindrical granite slip plate support block 14, specifically on oil film 16 on the support block upper surface for sliding universally, i.e. in any direction relative to the support block which is coplanar with the top of the support block. The slip plate 12 is conventional and typically fabricated of magnesium to be lightweight and highly rigid. A test piece, not shown, is secured to the slip plate 12 for vibration testing, in two axes according to the invention. The movement of the slip plate 12 is constrained to particular axes by novel flexure means indicated at 13, which will hereinafter be more fully described.

Disposed at right angles to each other, and secured to the slip plate edges 12a and 12b, are duplicate vibrating means in the form of vibration shakers 18, 20. The construction of these shakers including cantilever support of the shaker armatures by the slip plate 12 is novel and will be hereinafter described. It will be observed initially that the shakers 18, 20 are coupled to the slip plate 12 by horizontal series of like, vertically disposed, individual driver bars 24, 26 of suitable metal, again usually magnesium, each having projecting flanges 30 defining slots 32 into which the edge margins 12a, 12b of the slip plate 12 are inserted. The driver bars 24, 26 have horizontal holes 31 for bolts 33 to connect to the adaptor 74 as will be seen. A series of vertically disposed expanding bolts 34 pass through driver bar upper and lower flanges 30 and registering apertures 35 in the slip plate 12 to complete rigid securement of the slip plate to the driver bars 24, 26.

The slip plate support block 14 rests upon a mass 38 formed of steel and filled with concrete. Three steel pillars 40 are embedded in the concrete mass 38 and project freely from the mass to support the support block 14 spaced from the mass, to facilitate absolute leveling of the support block, and to provide an oil reservoir 41 below the support block. Oil supply line 42 extends from a supply at 43 through the mass 38, into and up through the slip plate support block 14 centrally to its surface delivering oil for forming film 16. Excess oil runs down the support block 14 sidewalls, is confined by the flexure cylinder 13 to be described to have the oil level shown in FIG. 4 at 41a, whence the oil is recovered for recirculation in oil return line 44. It is noteworthy that uniquely among oil film tables in use, the present apparatus positively prevents oil contamination beyond the apparatus, as will be seen hereinafter.

Figure 5:
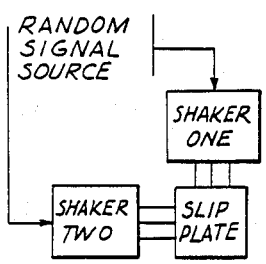
FIG. 5 is a schematic view of signal input means to the apparatus.

It is a signal feature of the invention that the slip plate 12 is driven in two axes simultaneously, in a first direction by shaker 18, and in a second direction at a right angle to the first by the second shaker 20 responsive to the input of random signals separately into the shakers from a common, or separate signal source, see FIG. 5. The remarkable result of two-axis driving of the slip plate 12 is achieved by having each shaker be a driver independent of the other in its particular direction and a slave to the other shaker in the transverse direction.

With reference particularly to FIGS. 1, 2 and 3, the shakers 18, 20 are duplicates and each comprises a metal housing, rectangular which is itself unusual, and having a rear wall 50, topwall 52, bottom wall 54, and front wall 56 with enlarged openings at 58, for purposes to appear. Front wall 56 is thickened somewhat relative to rear wall 50 to flux-compensate for the presence of the openings 58. Within the housing walls 50-56, which together with outer pole pieces 57 define magnetic flux paths, a cooperating field coil and armature arrangement is provided of unique enabling the driving/slave operation referred to above. Outer pole pieces 57 may be extended opposite the lateral ends of armature 66 where the armature is not to be laterally translatable, e.g. when a single axis of vibration is needed. There is a gain of about 15% in output where the outer pole pieces 57 cover the armature 66 ends in this manner. It will be noted that all parts of the shaker are readily fabricated from available stock materials, to keep shaker construction cost low, particularly where essentially all parts are rectangular as shown in the preferred embodiment described herein. Additionally, air circulation is good through the apparatus, lowering operating temperatures and enhancing efficiency.

The shakers 18, 20 each have a center pole plate 59 extending horizontally along the longitudinal or driving axes 18a or 20a of the shaker, a rearward pair of field coils 60 disposed in a vertical plane intersecting the plane of the pole plate 59. Spaced from the rearward field coil pair 60 along the shaker longitudinal axes 18a and 20a respectively, are a forward pair of field coils 62 in a vertical plane which also intersects the plane of the center pole plate 59, and which, further, is parallel to the plane of the rearward field coils. The field coils 60, 62 comprise coils of wire arranged to have central rectangular openings 64 within which the center pole plate 59 is disposed, as shown.

An armature 66 lies in a vertical plane parallel to the planes of, and is positioned between, the rearward and forward pairs of field coils 60, 62, i.e. in the interspace defined by the longitudinal spacing of the field coil pairs, and encloses the center pole piece 59 between the coil pairs. It will be noted that the major axis of the armature 66 extends transversely of the shaker longitudinal axes 18a, 20a, respectively. Also, the armature 66 is not fully enclosed by field coils 60, 62 which may seem an apparent disadvantage in comparison with conventional field coil/armature arrangements of the solenoid type, but it has been found that the disclosed design is surprisingly efficient in pounds of force obtained per unit of power.

The armature 66 is comprised of wires 68 wrapped endwise on a temporary or permanent mandrel such as metal frame 70 (see FIG. 3) and on both the inner and outer surfaces thereof as shown, in concentric, congruent rectangles. After thus being wound, the wire is bonded with epoxy resin or the like for permanence. The wrapped frame 70 defines an open, generally rectangular figure centering the wires 68.

The armature frame 70 is preferably provided with a skirt extension 72, see FIG. 3, which projects forwardly from the wire-wrapped frame portion in a tapering manner to a thin edge 73. The skirt extension 72 is rectangular in cross-section and is used to mount the driver bars 24, 26 to the armature 66 through an adaptor 74 as will now be described.

The driver bars 24, 26 are rigidly coupled to the slip plate 12 by expanding bolts 34 as noted above. Vibratory oscillation of the slip plate 12 in response to the operation of shaker 18 or 20 is effected by corresponding movement of the armature 66, specifically frame 70 and its skirt 72 along the shaker longitudinal axis 18a or 20a respectively. Because the driver bars 24, 26 are generally differently sized from the armature skirt 72, an intermediate member, adaptor 74, is used. The frame skirt 72 is congruent with the rearward portion of the adaptor 74 and interfits a closed or open face slot 76 formed there to which the skirt is cemented by epoxy resin or the like. The adaptor 74 in its forward portion is relatively thicker walled and sized to register approximately with the pattern of bolts 33 in the driver bars 24, 26. Being rectangular in cross section, the adaptor 74 is congruent with center pole plate 59, the armature 66, the opening 64 in the field coil pair 62, and the overall pattern of the driver bar holes 31. The adaptor 74 defines a series of tapped holes 78 into which driver bar mounting bolts 33 are threaded mounting the driver bar to the adaptor and thus to the armature 66. The bolts 33 pass through apertures 58 in the shaker housing front wall 56 which are relatively enlarged (but exaggerated in the drawing) to permit lateral as well as reciprocal movement and combinations of such movements in concert with the armature 66.

Thusfar described, the shaker 18 and shaker 20, are arranged to drive the slip plate 12 both along the longitudinal axis 18a of the first shaker 18, and also along the longitudinal axis 20a of the second shaker 20. The shakers 18 and 20 are of course at right angles and mutually rigidly coupled to the common slip plate 12, so that provision must be made for each shaker to accommodate the driving of the other. The rectangular design of center pole plates 59, armature 66 and field coils 60, 62 described above and illustrated in the drawings, enables the second shaker 20 armature to move laterally responsive to driving of the slip plate 12 by the first shaker 18, and vice versa for the first shaker 18 relative to driving by the second shaker 20. Accordingly, the shakers 18, 20 drive in their longitudinal axes, and are slaved in the transverse axes.

Referring to FIG. 3, it will be noted that the armature 66, adaptor 74 and bolts 33 are unsupported within the shakers 18, 20. It is a further signal feature of the present apparatus and method that the armatures 66 be free floating with respect to their respective shakers, other than being subject to the magnetic fields generated therein. In the invention apparatus, the slip plate 12, acting through driver bar 24, 26, bolts 33 and adaptor 74 support the armature 66, in cantilever fashion. This mounting method for the armature provides the lateral mobility so essential to lateral movement in the slave aspects of armature 66 movement. The coils 60, 62 of course are shaped to accommodate and allow lateral movement freedom as shown, e.g. at opening 58.

The slip plate 12 rests on an oil film 16 as mentioned. The surface tension of the oil film 16 tends to block non-horizontal plane movement of the slip plate 12, or riding up under the forces of the shakers 18, 20, despite the slip plate moving rapidly otherwise than angularly as it responds to the separate signal inputs transmitted to it by the armatures 66. The circular mounting of the slip plate 12 on the flexure cylinder 13, described hereinafter, keeps the plate from tipping at one side or another, and thus blocks loss of the oil film surface tension in that manner. Tipping of the slip plate 12 may cause the armature 66 to strike the center pole plate 59.

Because angular movement is to be avoided and forces on the slip plate 12 channeled into linear movement in the axes of interest, 18a, 20a, it is necessary to control the slip plate movement. It will be recalled that the slip plate 12 rides on oil film 16 on support block 14 and untrammeled on all sides for universal movement in its intended locus of movement. The armatures 66 being cantilevered from the slip plate 12 and there being no means within the shakers 18, 20 to limit slip plate movement to axial movement, by which is meant herein movement in linear directions, i.e. not pivoting movement, the slip plate itself must be constrained into linear movement.

Figure 4:
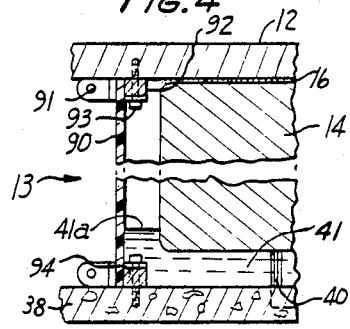
FIG. 4 is a fragmentary vertical sectional view taken on line 4—4 in FIG. 1.

Constraint of the slip plate 12 into linear movement herein is achieved by the use of a flexure means, e.g. cylinder 13 which preferentially allows linear movement, and as well blocks pivoting movement around the vertical central axis of the slip plate. In FIG. 4 support block 14 is circumscribed by a torsion means in the form of a cylinder such as a torsionally stiff nylon plastic sleeve 90 of the type used for industrial belting, or bellows, or other symmetrical or assymmetrical structure which is bendable along its longitudinal (vertical in the Figure) axis but so stiff in torsion as to adamantly resist rotation of one end relative to the other, the energy of pivoting moments on one end to the other being converted instead into linearly directed force, so that pivoting moments result in linear, bending movement of the sleeve 90. After bending, the sleeve 90 tends to restore the slip plate 12 to its center position.

As is shown in FIGS. 2 and 4, the sleeve 90 is secured to the underside of the slip plate 12 by clamping with hose clamp 91 to a flanged ring 92 secured to the slip plate all around by a series of fasteners 93 at the upper end of the sleeve, while the lower end of the sleeve is secured to the mass 38 by a second hose clamp pinching the sleeve against a flanged ring 94. The sleeve 90 thus must twist for the slip plate 12 to move pivotally, given the weight of mass 38, but the sleeve is extremely twist resistant, because torsionally stiff; the slip plate is blocked from pivoting movement; and any received moments of that kind are converted to linear movement by bending of the sleeve along its longitudinal axis.

The sleeve 90 is oil-tightly secured at the top and bottom whereby oil from the oil film 16 is confined within the sleeve, and personnel and nearby equipment are not subjected to oil contact. And, as mentioned, the uniform circular support afforded by the ring/sleeve mounting system for the slip plate 12 reduces tends to prevent long term loss of desired oil film 16 and its slip plate-stabilizing surface tension under one or another part of the slip plate, and consequent loss of slip plate balance.

In practice, a test piece to be evaluated at the end of a production cycle is mounted to the slip plate, and random signals are put into the shakers. Each shaker drives the slip plate in its longitudinal direction, but the intercoupling of the shaker armatures by the slip plate causes the armature of the one shaker to shift laterally responsive to the other shaker driving of the slip plate even as that other shaker itself drives the slip plate, and the one shaker armature as well. The torsion support for the slip plate converts angular moments to linear movement, keeping the test non-pivoting and axial. The test piece is thus subjected to two axis motion and reliably screened for manufacturing defects.

There is thus provided in accordance with the invention a screening vibration shaker apparatus using two shakers in simultaneous manner on a common slip plate, the shaker armatures being driving and slaved for two axis movement and cantilevered from the slip plate for lateral freedom, and the slip plate being free of pivoting movement by use of torsionally stiff support for the slip plate.

I claim:

1. Vibration screening apparatus for the screening testing for manufacturing defects of a test piece carried on a rigid slip plate, said apparatus comprising angularly opposed first and second vibrating means each having bodily longitudinal displaceability in a first axis for driving the slip plate and lateral freedom in a second axis to permit longitudinal displacement of the other for driving the slip plate in two coplanar axes simultaneously, and separate means fixed to said slip plate in a manner constraining slip plate freedom of movement into said driving axes.

2. Vibration screening apparatus according to claim 1, in which said vibrating means comprises first and second armatures within separate field coil means and separately coupled to said slip plate for driving said slip plate in said driving axes.

3. Vibration screening apparatus for the screening testing for manufacturing defects of a test piece carried on a rigid slip plate, said apparatus comprising vibrating means driving the slip plate in two coplanar axes simultaneously, and separate means constraining slip plate movement into said driving axes, said constraining means comprising torsion means fixed to said slip plate in a manner limiting slip plate freedom of movement to said driving axes.

4. Vibration screening apparatus according to claim 3, including also a slip plate support block supporting said slip plate in universally slidable relation.

5. Vibration screening apparatus according to claim 4, including also a mass supporting said slip plate support block, said torsion means being fixed to said mass and to said slip plate against pivoting movement of said slip plate relative to said mass.

6. Vibration screening apparatus according to claim 3, in which said torsion means comprises a longitudinally bendable, torsionally stiff torsion member adapted to be fixed to said slip plate and to a mass spaced from said slip plate, said torsion member being so constructed and arranged as to permit linear movement of the slip plate in its driving axes while blocking slip plate pivoting movement around its center vertical axis.

7. Vibration screening apparatus according to claim 6, in which said vibrating means comprises first and second vibration shakers relatively angularly disposed about a horizontally extended locus of slip plate two axis vibration, said torsion member being vertically disposed and fixed to the underside of said slip plate within said locus.

8. Vibration screening apparatus according to claim 7, including also a rigid slip plate horizontally disposed within said vibration locus, said torsion means being cylindrical, and means circularly affixing said cylindrical torsion means to said slip plate underside.

9. Vibration screening apparatus according to claim 8, including also a slip plate support block relatively less horizontally extended than said slip plate and having an oil film supply to its surface of supporting engagement with said slip plate, whereby said slip plate is supported in universally slidable relation within said vibration locus, said torsion means cylinder enclosing said support block.

10. Vibration screening apparatus according to claim 9, in which said vibration shakers are at right angles to each other, and including also a mass supporting said slip plate support block, and means circularly affixing said torsion means cylinder to said mass at the lower cylinder end, said torsion means cylinder being affixed at its upper end to said slip plate, whereby alternate shaker driving of said slip plate in either of said two axes is accommodated by longitudinal bending of said torsion means cylinder between said mass and said slip plate, while pivoting slip plate moments resultant from driving of said slip plate in two axes simultaneously by said shakers are converted to linear movement along a slip plate driving axis by the torsional stiffness of said torsion means cylinder.

11. Vibration shaker for a slip plate comprising field coil means and an armature, and means connecting said armature to said slip plate, said armature driving said slip plate through said connecting means while being cantilever supported by said slip plate for displacement bodily longitudinally and laterally simultaneously within and relative to said field coil means, said slip plate being untrammelled on all sides for universal movement in its locus of intended movement.

12. Vibration shaker according to claim 11, in which said armature has longitudinal displaceability and lateral freedom bodily within said field coil means for two axis vibration of a slip plate coupled to said armature.

13. Vibration shaker according to claim 11, in which said armature comprises a wire winding of generally rectangular cross-section disposed normal to the armature axis of longitudinal displacement.

14. Vibration shaker according to claim 13, including also an armature frame supporting said wire winding in its said disposition.

15. Vibration shaker according to claim 14, in which said armature frame defines an open, generally rectangular figure, and said wire winding extends longitudinally in concentric rectangles on the inner and outer surfaces of said frame.

16. Vibration shaker according to claim 14, in which said field coil means comprises a wire coil defining a generally rectangular opening congruent with and larger than said armature frame.

17. Vibration shaker according to claim 11, in which said field coil means comprises front and rear generally rectangular wire coils disposed transversely to and relatively spaced along the armature displacement longitudinal axis in operative association with said armature.

18. Vibration shaker according to claim 17, in which each said front and rear coil means comprises a pair of like wire coils.

19. Vibration shaker for a slip plate comprising field coil means and an armature, and means connecting said armature to said slip plate, said armature which driving said slip plate through said connecting means while being cantilever supported thereby relative to said field coil means, said armature comprising a wire winding of generally rectangular cross-section disposed normal to the armature axis of longitudinal displacement, an armature frame supporting said wire winding in its said disposition, and means for connecting said armature frame to a slip plate driver bar in cantilevered relation, said means comprising an adaptor secured between said frame and said driver bar, said field coil means including a coil of wire surrounding said adaptor between said armature frame and said slip plate driver bar.

20. Vibration shaker according to claim 19, in which said connecting means further comprises a skirt extension on said armature frame beyond said wire winding, and armature frame securing means securing said frame to said adaptor including skirt extension receiving means formed on said adaptor.

21. Vibration shaker according to claim 20, in which said frame skirt extension is rectangular and terminates in a thin edge, and said adaptor defines a complementary rectangular slot adapted to receive said frame skirt edge.

22. Vibration shaker according to claim 20, in which said adaptor defines a series of rectangularly distributed driver bar bolt holes adapted to receive driver bar supporting bolts.

23. Vibration shaker according to claim 22, including also a driver bar bolted to said adaptor, said driver bar being bolted to said slip plate.

24. Vibration shaker apparatus for two axis vibration of a slip plate carrying a test piece, said apparatus comprising: a first vibration shaker comprising first field coil means and a first armature having longitudinal displaceability in a first axis and lateral freedom in a second axis bodily within said field coil means; and a second vibration shaker comprising second field coil means and second armature having longitudinal displaceability in said second axis and lateral freedom bodily within said second field coil means in said first axis, said armatures being driven separately by their respective field coils for driving said slip plate coupled thereto in two axes simultaneously in slip plate supported relation.

25. Vibration shaker apparatus according to claim 24, in which each said armature comprises a wire winding of generally rectangular cross-section disposed normal to the axis of armature longitudinal displacement.

26. Vibration shaker apparatus according to claim 25, in which each armature further comprises an open, generally rectangular metal frame, and each said wire winding extends longitudinally in concentric rectangles on the inner and outer surfaces of said frame.

27. Vibration shaker apparatus according to claim 26 in which each field coil means comprises a wire coil defining a generally rectangular opening lying in the plane transverse to the armature axis of longitudinal displacement.

28. Vibration shaker apparatus according to claim 27, including also for each shaker means for connecting said armature frame to said slip plate in cantilevered relation, said connecting means including a slip plate driver bar, an adaptor of generally rectangular cross-section secured between said frame and said driver bar, said field coil wire coil rectangular opening surrounding said adaptor between said armature frame and said slip plate driver bar, a rectangular skirt extension on said armature frame terminating in a thin edge beyond said wire winding, and armature frame securing means on said adaptor including skirt extension receiving means comprising a complementary rectangular recess formed in a face of said adaptor to receive said frame skirt edge.

29. Vibration shaker apparatus according to claim 28, in which said adaptor opposite said skirt extension recess defines a series of rectangularly distributed driver bar bolt holes adapted to receive driver bar supporting bolts.

30. Vibration shaker apparatus according to claim 29, in which said first and second shakers are disposed at right angles to each other, and including also a common slip plate, and first and second driver bars bolted to first and second adaptors coupled separately to right-angle disposed sides of said slip plate, said slip plate supporting said first and second armatures for two axis vibration.

31. Vibration shaker apparatus according to claim 30, including also front and rear generally rectangular wire coils defining said field coil means and disposed transversely to and relatively spaced along the armature displacement longitudinal axis in operative association with said armature, and a housing enclosing said shaker apparatus, said housing passing said driver bar bolts free of interference in laterally translated condition of said armature.

32. Vibration shaker apparatus according to claim 24, including also, means for constraining slip plate movement into said driving axes.

33. Vibration shaker apparatus for two axis vibration of a slip plate carrying a test piece, said apparatus comprising: a first vibration shaker comprising first field coil means and a first armature having longitudinal displaceability in a first axis and lateral freedom in a second axis bodily within said field coil means; a second vibration shaker comprising second field coil means and second armature having longitudinal displaceability in said second axis and lateral freedom bodily within said second field coil means in said first axis, said armatures being driven separately by their respective field coils for driving said slip plate coupled thereto in two axes simultaneously in slip plate supported relation, and torsion means for constraining slip plate movement into said driving axes, said shakers being separately coupled to said slip plate in angularly disposed relation for driving said slip plate in said driving axes.

34. Vibration shaker apparatus according to claim 33, including also a rigid slip plate, said torsion means being fixed to said slip plate in a manner limiting slip plate freedom of movement to said driving axes.

35. Vibration shaker apparatus according to claim 34, including also a slip plate support block supporting said slip plate in universally slidable relation.

36. Vibration shaker apparatus according to claim 35, including also a mass supporting said slip plate support block, said torsion means being fixed to said mass and to said slip plate against angular movement of said slip plate relative to said mass.

37. Vibration shaker apparatus according to claim 36, in which said torsion means comprises a longitudinally bendable, torsionally stiff torsion member adapted to be fixed to said slip plate and to a mass spaced from said slip plate, said torsion member being so constructed and arranged as to permit linear movement of the slip plate in its driving axes while blocking slip plate pivoting movement around its center vertical axis.

38. Vibration shaker apparatus according to claim 37, in which said shakers are disposed at right angles to a horizontally extended locus of slip plate two axis vibration, said torsion member being vertically disposed and fixed to the underside of said slip plate.

39. Vibration shaker apparatus according to claim 38, in which said rigid slip plate is horizontally disposed within said vibration locus, said torsion means being cylindrical, and means circularly affixing said cylindrical torsion means to said slip plate underside comprising an annular ring fixed to the slip plate within said torsion means, and an external clamp clamping said trosion means to said ring.

40. Vibration shaker apparatus according to claim 39, in which said slip plate support block is relatively less horizontally extended than said slip plate and has an oil film supply to its surface of supporting engagement with said slip plate, whereby said slip plate is supported in universally slidable relation within said vibration locus, said torsion means cylinder enclosing said support block in oil-retaining relation.

41. Vibration shaker apparatus according to claim 40, including also means circularly affixing said torsion means cylinder to said mass at the lower cylinder end, said torsion means cylinder being affixed at its upper end to said slip plate, whereby shaker driving of said slip plate in either of said armature longitudinal axes is accommodated by longitudinal bending of said torsion means cylinder between said mass and said slip plate, while pivoting slip plate moments resultant from driving of said slip plate in two axes simultaneously by said shakers are converted to movement along said slip plate driving axes by the torsional stiffness of said torsion means cylinder.

42. Vibration shaker apparatus for two axis vibration of a slip plate carrying a test piece, said apparatus comprising: a slip plate; a first vibration shaker comprising a housing and therewithin a horizontally disposed center pole plate, first spaced double pairs of rectangular field coils, and between said double coil pairs a first metal frame supported wire armature cantilevered from said slip plate and having longitudinal displaceability in a first axis and lateral freedom in a second axis bodily between said field coil double pairs; said coil pairs and said armature lying in a series of spaced parallel vertical planes and enclosing said center pole plate in their respective vertical planes; and a second vibration shaker identical to the first in in field coil and armature and disposed at a right angle to the first shaker so that its armature also cantilevered from said slip plate has longitudinal displaceability in said second axis and lateral freedom bodily between field coil double pairs in said first axis, and a torsion member guiding said slip plate from below preferentially along said slip plate driving axes by torsionally resisting pivoting movement of said slip plate in response to being driven separately by said armatures in two axes simultaneously.

43. Vibration shaker apparatus according to claim 1, 11, 24, or 42, including also means inputting random or sine vibration signals to said shaker in armature longitudinal displacement controlling relation.

44. Method for effecting screening testing of a test piece carried on a rigid slip plate, which includes vibrating said slip plate in two coplanar axes simultaneously while separately constraining said slip plate for movement in driving axes only and untrammelled on all sides for universal movement in its intended locus of movement.

45. Method for effecting screening testing of a test piece carried on a rigid slip plate, which includes vibrating said slip plate in two coplanar axes simultaneously by a pair of armatures while cantilever supporting said armatures by said slip plate, said slip plate being untrammelled on all sides for universal movement in its intended locus of movement.

46. The method according to claim 44 or 45, including also driving said slip plate from a first side thereof along one of said axes, driving said slip plate from a second side thereof along the other of said axes, said first and second axes being angularly disposed, and blocking pivoting response of said slip plate to said driving forces to limit slip plate movement to its said driving axes.

47. Method for effecting screening testing of a test piece carried on a rigid slip plate, which includes vibrating said slip plate in two coplanar axes simultaneously while separately constraining said slip plate for movement in driving axes only and maintaining said slip plate fixed to a mass through a longitudinally bendable torsion member during slip plate driving in slip plate movements along said axes-permitting and slip plate driving force induced pivoting movement-resisting relation.

* * * * *